Jan. 6, 1925.
K. ARNSTEIN
1,521,590
JOINT FOR FRAMES FOR AIRSHIPS
Filed April 8, 1922
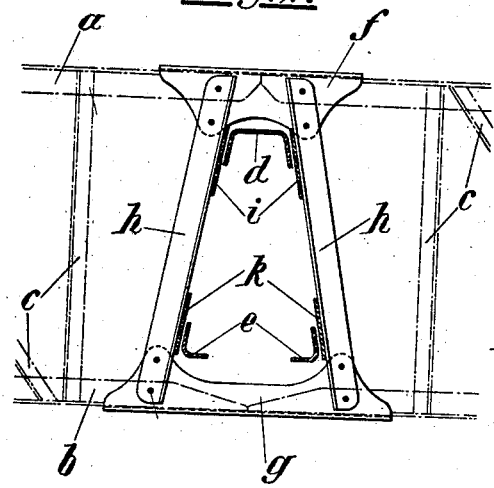
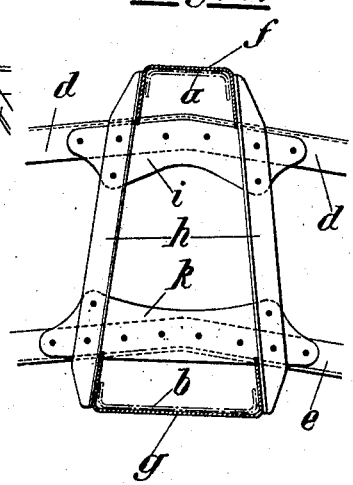
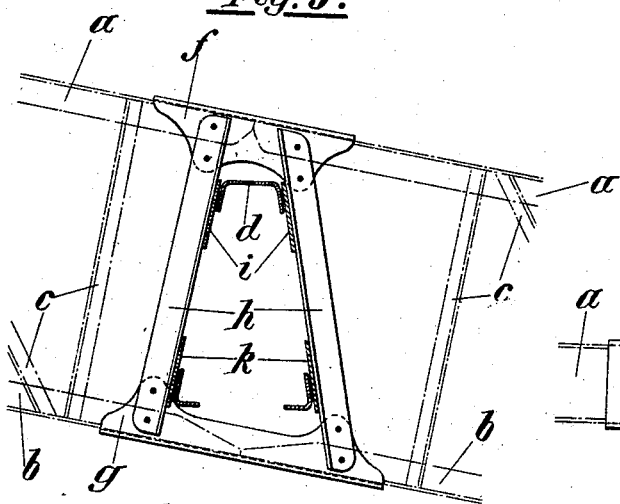
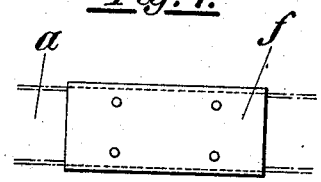
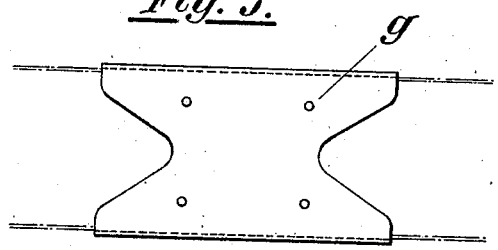
INVENTOR:
Karl Arnstein
by  Attorney.

Patented Jan. 6, 1925.

1,521,590

UNITED STATES PATENT OFFICE.

KARL ARNSTEIN, OF FRIEDRICHSHAFEN, GERMANY, ASSIGNOR TO THE FIRM LUFTSCHIFFBAU ZEPPELIN, GESELLSCHAFT MIT BESCHRÄNKTER HAFTUNG, OF FRIEDRICHSHAFEN, GERMANY.

JOINT FOR FRAMES FOR AIRSHIPS.

Application filed April 8, 1922. Serial No. 550,884.

*To all whom it may concern:*

Be it known that I, KARL ARNSTEIN, a citizen of Czechoslovak Republic, residing at Friedrichshafen a/B., Germany, have invented certain new and useful Improvements in Joints for Frames for Airships (for which I have filed an application in Germany on April 1st, 1921), of which the following is a specification.

My invention refers to the frames of air ships and its particular object is a novel kind of joint to be used in such frames.

One of the principal problems in the construction of the frames for air ships is the provision of a convenient connection of the longitudinal supports which are continuously extending above and through the rings, with the ring terminals.

In view of the fact that the number of these connections is exceedingly large, and the angles of inclination of the longitudinal supports is subject to great variations owing to the necessity of adapting the longitudinal supports to the shape of the hull, the manner heretofore resorted to of providing connecting members which are rigidly secured by rivets or the like necessitated a large amount of work for draftsmen and mechanics for the construction of the very great number of sheet metal connecting joints, fish plates and bolts required and to manufacture them into the required structural units; and there was the additional inconvenience that the assembling of the parts required a large amount of labour considering the fact that all these connecting members have to be manufactured upon a scaffold.

This invention is intended to provide means for overcoming this difficulty in a very simple manner. In the practice of my invention I make use of two guide shoes adapted for the reception of the upper and lower truss or strut of the longitudinal support, and which are manufactured for all the rings and adapted to be connected to four angles of the ring polygon in accordance with the inclination of the longitudinal supports. The longitudinal support is made to engage with these shoes by means of its ends projecting beyond the last preceding vertical strut, and is then threadedly secured in position or in any other convenient manner.

This manner of construction, while very simple and not expensive satisfies all requirements heretofore enumerated.

My invention is illustrated upon the accompanying drawing in two forms of embodiments of the invention, Figs. 1 and 2 being a sectional view through a ring support in the proximity of the longitudinal support and respectively through the longitudinal support in the proximity of the ring support at one of the joints at which the longitudinal support has no inclination or only a very slight inclination relatively to the longitudinal axis of the hull, or the centre part of the hull.

Fig. 3 illustrates the invention at one of the joints in the front and rear part of the hull as a sectional view through the ring support in the proximity of the longitudinal support.

Fig. 4 is a top plan view of the shoe referred to corresponding to Figs. 3 and 1; and Fig. 5 is a corresponding bottom view of the lower shoe.

The frame structure comprises a beam, girder or longitudinally extending member including a U-shaped upper truss member $a$ connected with a U-shaped lower truss member $b$ suitably, as by struts $c$. This lower truss member $b$ may in itself again constitute a truss made up of angle rods and struts for example.

Associated with the longitudinally extending members are cross members or ring supports. These comprise a U-shaped truss portion $d$ and a lower truss portion formed from angle members $e$.

A shoe $f$, U-shaped in section, snugly embraces the upper truss $a$, and another shoe $g$, of U-shape in section snugly embraces the lower truss member $b$. These shoes are connected together in any suitable manner, angle pieces $h$ in spaced relation and connected with the shoes being here shown.

The truss portion $d$ of the ring supports is connected with the other portions of the frame structure by means of fish plates $i$. These are here shown secured to the angle pieces $h$, and truss $d$, as by rivets. Similarly, angle members $e$ are connected with the frame structure by means of fish plates $k$. These are suitably secured to the angle members $e$ and angle pieces $h$, as by rivets.

In the present arrangement the ring supports or cross members pass through and between the longitudinally extending members $a$ and $b$, and where contiguous ends of these latter members are to be connected, their abutting ends are placed in approximate alinement with the central axis of the cross rings or near the median cross line of the shoes.

I wish it to be understood that I do not desire to be limited to the exact details of construction shown and described, for obvious modifications will occur to a person skilled in the art.

I claim:

1. A frame structure comprising a girder having truss members, connected together; a shoe embracing one of the truss members; a shoe embracing another of the truss members, a second girder disposed at an angle to the first and also having truss members; members connecting the shoes; and means for connecting certain of the truss members with the shoe connecting members.

2. A frame structure comprising a girder having spaced-apart truss members connected together; a shoe embracing each truss member; spaced-apart connecting members connected with the shoes and securing the shoes together; a second girder disposed at an angle to the first having truss members connected together; said second girder being disposed between the shoes and connecting members; and fish plates connecting portions of the second girder to the shoe-connecting members.

3. A frame structure comprising a girder having truss members connected together; shoes in spaced-apart relation embracing the truss members; spaced-apart connecting members connected with the shoes; a second girder having truss members, one of which includes angle pieces, disposed at an angle to the first girder; and fish plates connecting portions of the second girder with other portions of the structure.

4. A frame structure comprising a girder having truss members in spaced-apart relation and struts connecting the members; a shoe embracing each truss member and connected therewith; spaced-apart members attached to the shoes and connecting them together; a second girder disposed at an angle to the first and having truss members in spaced-apart relation, one of said truss members including angle pieces; fish plates connecting one of the truss members of the second girder with portions of the first girder; and fish plates connecting the angle pieces with the shoe connecting members.

In testimony whereof I affix my signature.

KARL ARNSTEIN. [L. S.]